US006258743B1

(12) United States Patent
Fleming et al.

(10) Patent No.: US 6,258,743 B1
(45) Date of Patent: *Jul. 10, 2001

(54) ISOTROPIC NEGATIVE THERMAL EXPANSION CERMICS AND PROCESS FOR MAKING

(75) Inventors: Debra Anne Fleming, Berkeley Heights; David Wilfred Johnson, Bedminster; Glen Robert Kowach, Edison; Paul Joseph Lemaire, Madison, all of NJ (US)

(73) Assignee: Agere Systems Guardian Corp., Allentown, PA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/146,518

(22) Filed: Sep. 3, 1998

(51) Int. Cl.$^7$ .......................... C04B 35/48; C04B 34/495
(52) U.S. Cl. ...................... 501/102; 501/103; 501/134
(58) Field of Search .................. 501/102, 103, 501/134

(56) References Cited

U.S. PATENT DOCUMENTS

| | | | |
|---|---|---|---|
| 4,303,447 | * 12/1981 | Buchanan et al. | 501/103 |
| 5,322,559 | * 6/1994 | Sleight | 501/102 |
| 5,334,562 | * 8/1994 | Newkirk et al. | 501/103 |
| 5,433,778 | * 7/1995 | Sleight | 501/102 |
| 5,694,503 | 12/1997 | Fleming et al. | |

OTHER PUBLICATIONS

CA 129:18685, Evens et al, "Negative Thermal Expansion Materials", 1997.*
CA 68:82042, Trunov et al, "X–ray Diffracion Study of Zirconium Molybdate, Hafnium Molybdate, Zirconium Tungstenate and Hafnium Tungstenate", 1967.*
CA 130:84659, Holzer et al, "Metal–Matrix Composites with Dispersed Oxide Particles for Low Thermal Expansion and High Thermal Conductivity", Jun. 1998.*

J. Graham et al., "A New Ternary Oxide, $ZrW_2O_8$", *Journal American Ceramics Society*, vol. 42, No. 11, p. 570 (1959).

Luke L.Y. Chang et al., "Condensed Phase Relations in the Systems $ZrO_2$—$WO_2$—$WO_3$ and $HfO_2$—$WO_2$—$WO_3$", *J. American Ceramic Society*, vol. 50, pp. 211–215 (1967).

Charles Martinek et al., "Linear Thermal Expansion of Three Tungstates", *Journal American Ceramic Society*, vol. 51, pp. 227–228 (1968).

T.A. Mary et al., "Negative Thermal Expansion from 0.3 to 1050 Kelvin in $ZrW_2O_8$", *Science*, vol. 272, pp. 90–92 (1996).

C. Verdon et al, "High temperature Reactivity in the $ZrW_2O_8$—Cu System", *Scripta Materialia*, vol. 36, pp. 1075–1080 (1997).

* cited by examiner

*Primary Examiner*—Karl Group
(74) *Attorney, Agent, or Firm*—Venable; Marina Schneller; Keith G. Haddaway

(57) ABSTRACT

Ceramic monoliths are described which exhibit tunable coefficients of thermal expansion from about −5 to −11× $10^{-6°}$ C.$^{-1}$ near ambient temperatures. These two-phase ceramics, which are fabricated, for example, by reactive sintering of $WO_3$ and $ZrO_2$, consists of a matrix of $ZrW_2O_8$ with inclusions of $ZrO_2$ having diameters less than 10 μm. Additives may increase the density of the monoliths to greater than 98% of the calculated density. Green body densities, pre-sintered particle size distribution, sintering atmosphere, microstructure, and mechanical properties are discussed. These ceramics may be used as substrates for thermally compensating fiber Bragg gratings.

21 Claims, 6 Drawing Sheets

ISOTROPIC NEGATIVE THERMAL EXPANSION CERMICS AND PROCESS FOR MAKING

FIELD OF THE INVENTION

This invention pertains to isotropic, negative thermal expansion ceramics, and to a process for preparing isotropic, negative thermal expansion ceramics which may, for instance, be used in temperature compensating grating packages.

TECHNOLOGY REVIEW

As described in U.S. Pat. No. 5,694,503, incorporated herein by reference, it is possible to package a fiber grating on or in a negative expansion material so that the package and grating dimensions decrease with an increase in temperature, resulting in minimal variation of the reflection wavelength with temperature.

In order for this approach to be practical the value for the thermal expansion of the package/substrate material must lie within an acceptable range. The ideal expansion coefficient is given by the expression $$\alpha_{ideal} = \alpha_{fiber} + \frac{-A}{(1-P_e)\lambda_{nom}}$$

where $\alpha_{fiber}$ is the thermal expansion of the fiber grating (for instance, $0.55 \times 10^{-6}$ °C.$^{-1}$), A is the temperature sensitivity of the unpackaged grating (e.g., 0.0115 nm °C.$^{-1}$ for a particular 1550 nm grating), $P_e$ is the photoelastic constant (typically 0.22) and $\lambda_{nom}$ is the nominal grating wavelength (~1550 nm in many cases). For a particular 1550 nm grating an "ideal" package material would have a thermal expansion coefficient (CTE) of $-8.96 \times 10^{-6}$ °C.$^{-1}$. A package material will still be beneficial even if its thermal expansion is not exactly equal to the ideal value. For the above assumptions a factor of about 20 improvement in temperature sensitivity would be achieved if the package material's thermal expansion coefficient were within $0.47 \times 10^{-6}$ °C.$^{-1}$ of the ideal value. Such improvement in thermal stability of a fiber grating would be of commercial importance.

It is known that $ZrW_2O_8$ is metastable at room temperature, with the lower limit of stability being at $1105 \pm 3$° C., below which $ZrW_2O_8$ decomposes into $ZrO_2$ and $WO_3$. See, for instance, J. Graham et al., *J. American Ceramics Society*, Volume 42, page 570 (1959), and L. L. Y. Chang et al., *J. American Ceramics Society*, Volume 50, page 211 (1967). It is also known that $ZrW_2O_8$ has a relatively high and isotropic negative coefficient of thermal expansion (CTE) over an extensive range of temperatures that includes room temperature. See, for instance, C. Martinek et al., *J. American Ceramics Society*, Volume 51, page 227 (1968) and T. A. Mary et al., *Science*, Volume 272, page 90 (1996). Specifically, the CTE is substantially constant from near absolute zero temperature to 150° C., with a value near $-10 \times 10^{-6}$ °C.$^{-1}$. The material exhibits an order-disorder transition at 150° C, after which the CTE drops to $-5 \times 10^{-6}$ °C.$^{-1}$. This value of the CTE is maintained until the decomposition of $ZrW_2O_8$ which occurs at a relatively high rate near 800° C.

In view of this complex behavior of $ZrW_2O_8$, it is not surprising that earlier attempts to produce mechanically strong monolithic bodies of $ZrW_2O_8$, that have a predetermined negative CTE, did not yield fully satisfactory results. For instance, C. Verdon et al., *Scripta Materialia*, Volume 36, page 1075 (1997) report that their attempts to form electrically conducting bodies from $ZrW_2O_8$ and Cu with a low CTE resulted in decomposition of the $ZrW_2O_8$ and formation of $Cu_2O$ along with other compounds. Such decomposition is generally undesirable and hinders the production of suitable bodies.

To the best of our knowledge, prior art efforts to make $ZrW_2O_8$ ceramic bodies used the conventional technique of sintering $ZrW_2O_8$ powder. Thus produced bodies have densities less than 90% of the theoretical density and exhibit relatively poor mechanical properties, specifically, a low modulus of rupture. Additional prior art describes the preparation of $ZrW_2O_8$ powder from oxide precursors to be an incomplete reaction.

In view of the importance, for instance, a reduction of the temperature dependence of the reflection wavelength of optical fiber gratings, it would be highly desirable to be able to reproducibly make mechanically strong ceramic bodies having tunable negative CTE values, the ceramic bodies being useful, for example, for packaging of fiber gratings. This application discloses a method for making such bodies.

SUMMARY OF THE INVENTION

We have made the surprising discovery that reactive sintering of appropriate percursor powders (e.g., $ZrO_2$ and $WO_3$) can result in (negative CTE) bodies (e.g., $ZrW_2O_8$) with substantially improved properties, as compared to analogous bodies produced by the prior art sintering techniques.

To the best of our knowledge, the prior art does not provide any suggestion that the use of reactive sintering could provide the observed improved results. By "reactive sintering" we mean herein compacting the unsintered body of the precursor oxides, rather than the powder of the desired final phase, and then forming the desired phase and densifying the body in a single heat treatment step.

In a broad aspect of the invention is embodied in a method of making negative CTE ceramic bodies, and in bodies produced by the method.

More specifically, the invention is embodied in a method of making a ceramic body having isotropic negative thermal expansion, the body having a major constituent selected from the group consisting of $ZrW_2O_8$, $HfW_2O_8$, $ZrV_2O_7$ and $HfV_2O_7$. The method comprises the steps of providing a powder mixture, forming a "green" body that comprises the powder mixture, and heat treating the green body. The powder mixture comprises a first and a second oxide precursor powder, selected respectively from the group consisting of $ZrO_2$ powder and $HfO_2$ powder, and the group consisting of $WO_3$ powder and $V_2O_5$ powder. The heat treatment of the green body includes heating the body to a temperature below the melting temperature of the selected constituent, such that the selected major constituent is formed from the green body by reactive sintering.

By a "green" body we mean herein the compacted precursor powders as a monolithic body prior to sintering.

In a preferred embodiment the powder mixture has a non-stoichiometric composition (e.g., excess $ZrO_2$), and the heat treatment results in formation of a 2-phase material, e.g., $ZrW_2O_8$ majority phase, with $ZrO_2$ inclusions dispersed in the majority phase. This embodiment allows tailoring of the CTE of the body.

In a further preferred embodiment the powder mixture comprises a minor amount of a sintering aid (e.g., $Y_2O_3$, $Bi_2O_3$, $Al_2O_3$, $ZnO$, $TiO_2$, $SnO_2$), whereby the density of the sintered body is substantially increased.

Important note for processing

Due to the unusually narrow stability region of $ZrW_2O_8$, standard techniques for synthesizing and densifying composite ceramics containing $ZrW_2O_8$ produce monoliths with inadequate physical properties. High purity $ZrW_2O_8$ is thermally stable between 1105 and 1260° C. Above 1260° C. $ZrW_2O_8$ peritectically decomposes into a liquid phase, and below 1105° C. it decomposes into $ZrO_2$ and $WO_3$. Additives significantly alter the stability region of $ZrW_2O_8$; this study demonstrates a working temperature range of 1140 to 1180° C. for $Y_2O_3$ doped $ZrW_2O_8$.

DETAILED DESCRIPTION OF THE INVENTION

The synthesis of $ZrW_2O_8$ has been described as challenging due its metastability. However, the fabrication of monoliths via reactive sintering is straightforward and reproducible upon consideration of the following points: additives (including impurities), particle size, and sintering atmosphere. Similarly, reactive sintering may be used to prepare $HfW_2O_8$, $ZrV_2O_7$, and $HfV_2O_7$.

Additives

Figure 1:
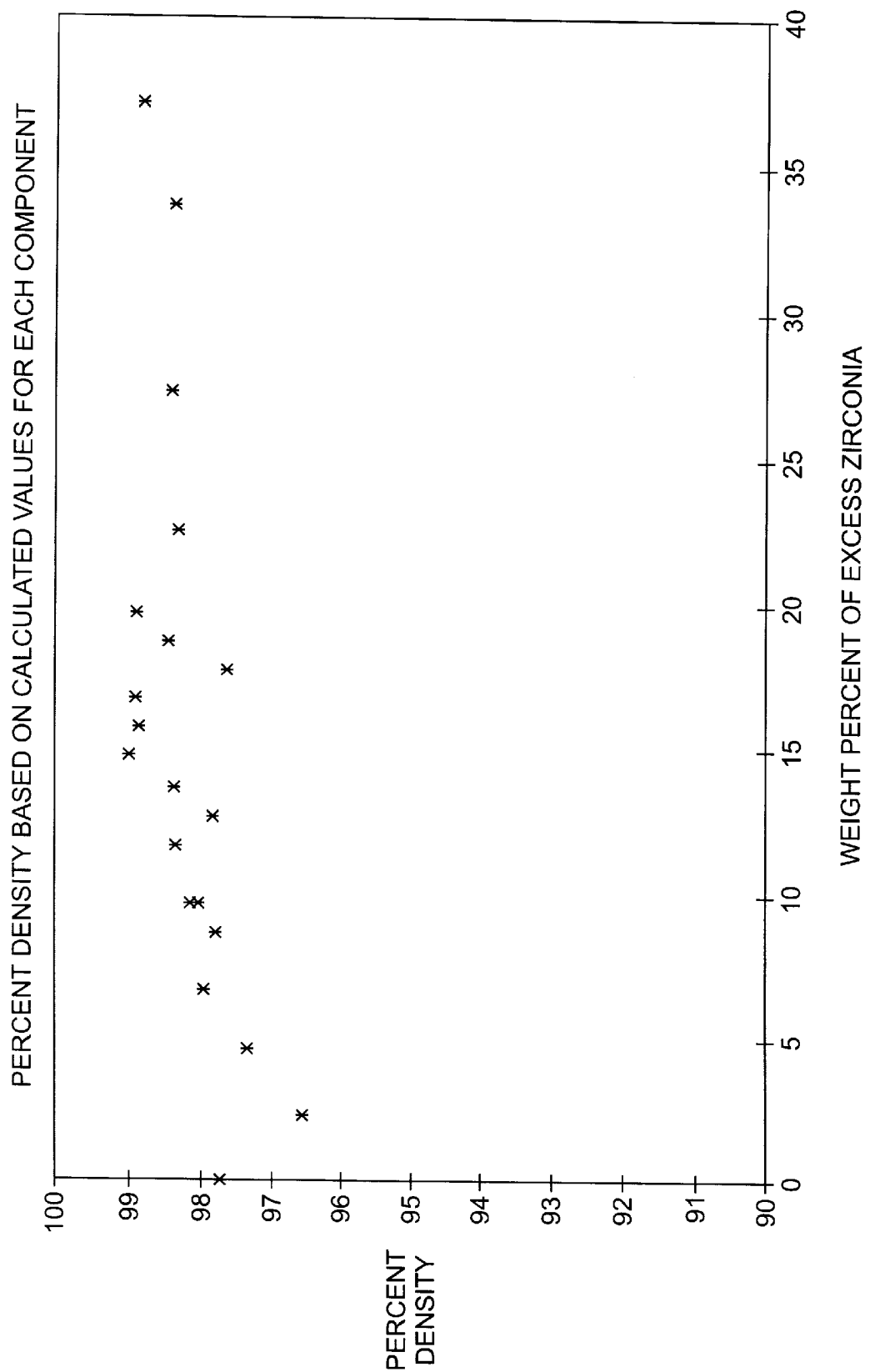
FIG. 1. Percent densities of $ZrW_2O_8 \cdot xZrO_2$ monoliths with $Y_2O_3$ additive plotted with respect to weight percent of additional $ZrO_2$.

In phase equilibria, additives which form a eutectic may be utilized as a liquid phase sintering aid, thereby significantly increasing the density of a ceramic. Liquid phases accelerate material transport during sintering by serving as a solvent for the solid phase with subsequent precipitation to yield dense ceramics. Monoliths of $ZrW_2O_8 \cdot xZrO_2$ prepared with a $Y_2O_3$ additive have achieved, densities greater than 99% the calculated theoretical density (FIG. 1). The density of a high purity $ZrW_2O_8$ monolith is only 92%. Several oxides typically used as sintering aids including refractory oxides were investigated (Table 1). Increased densities were observed without decomposition of $ZrW_2O_8$, for small amounts (0.1 wt. %) of additives. In order to easily observe enhanced differences in density, the samples were milled for only two hours (vide infra). Of the additives which were surveyed, all increased the density of the monoliths with exception of $SiO_2$. The following series illustrates the relative effectiveness of the additives: $Y_2O_3>Bi_2O_3>Al_2O_3\sim ZnO>TiO_2$.

Densification via liquid phase sintering has been demonstrated in several ceramic systems and is extensively employed in the ceramic industry in order to decrease sintering times and temperatures. For effective liquid phase sintering, only 1 vol. % of liquid within grain boundaries is necessary to aid densification. Increasing the concentration of $Al_2O_3$, $TiO_2$, or $Y_2O_3$, to a few weight percent leads to complete decomposition of $ZrW_2O_8$ and melting of the monolith at the sintering temperature. This suggests that a liquid phase is present at 1180° C. even at low concentrations of additives. Similar equilibria have been observed in the alkali metal-$WO_3$—$ZrO_2$ systems with eutectic temperatures below 600° C. Consequently, liquid phase sintering is a preferred mechanism for enhanced densification.

Due to the impact of additives on the sintered density, it is important to characterize the impurities in the starting materials and grinding media. An important consideration is the selection of appropriate grinding media based on composition in order to prevent undesired impurities, such as $Al_2O_3$ and calcium stabilized $ZrO_2$, from incorporation into the monoliths.

Pre-sintering Particle Size

The particle size, particle size distribution, and uniformity of particle packing are important factors in the densification process. In this study of the preparation of $ZrW_2O_8 \cdot xZrO_2$ monoliths, these factors have the greatest impact on sintered density. In general, smaller particles are more reactive and tend to densify at lower temperatures. Coarse particles have less surface energy which diminishes the driving force for consolidation. For conventional powder processing, the optimum particle diameter is approximately 1 μm. Particles significantly smaller than this are difficult to pack uniformly and densely due to agglomeration and undergo excessive shrinkage with entrapped porosity during firing. In addition, a range of particle sizes is advantageous towards achieving maximum packing density in the green body. However, non-uniformities in particle packing may result in voids which are difficult to eliminate during the densification process. Variations in green body densities produced during the forming process can also result in warpage during sintering.

The dependence of sintered density on green body density was accomplished by dry-pressing samples at applied pressures of 1000 psi to 20,000 psi. All the samples were pressed in the same ¼ in. cylindrical die and therefore had the same green diameter. Information in Table 2 expounds the effects of green body density on linear shrinkage and the aspect ratio of the pellets after sintering. Samples pressed at lower pressures had lower green densities and underwent greater linear shrinkage during firing. All samples consolidated to a similar density of approximately 4.45 g/cm³, independent of their initial green densities. The initial particle size or surface area, rather than initial green density of the compact had a greater impact on the final sintered density. These data suggest that the primary driving force for densification of $ZrW_2O_8$ is the reduction of surface free energy. However, complexities due to reactive sintering with the aid of additives obscure the sole effect of surface energy minimization.

The as-received mixture of powders had a bimodal particle size distribution around 600 μm and 50 μm. Monoliths fabricated from this coarse, unreactive material actually decreased in density after sintering. It was necessary to comminute the starting materials by vibratory milling. As the milling time increased the particle size initially decreased significantly to approximately 1 μm diameter. Milling times were limited to 16 h due to concerns of contamination from the grinding media.

Sintering Atmosphere

Loss of oxygen in $ZrW_2O_8$ has been observed at temperatures as low as 500° C. in vacuum, while retaining the crystal structure. Another study found that oxygen scavengers (e.g. Cu) promote decomposition of $ZrW_2O_8$ at low temperatures (600° C.) through the formation of $Cu_2O$. It has been found that monoliths sintered in air at 1180° C. partially decompose on the surface, followed by volatilization of $WO_3$. Heating $ZrW_2O_8$ in a $N_2$ atmosphere at the sintering temperature leads to complete decomposition into $ZrO_2$ and $WO_3$, whereas sintering in pure oxygen produced single phase $ZrW_2O_8$ with minimal surface decomposition. In addition, monoliths sintered in oxygen demonstrated reproducible physical properties.

Microstructure

Figure 2:
FIG. 2. SEM micrograph of a $ZrW_2O_8 \cdot 18$ wt. % $ZrO_2$ monolith viewed with secondary electron imaging. $ZrO_2$ inclusions with various particle sizes having a maximum diameter of approximately 10 μm appear with darker contrast.

The microstructure of a nearly stoichiometric $ZrW_2O_8$ monolith reveals large grains of $ZrW_2O_8$ having approximately a 20 μm diameter which form the matrix of the ceramic. The uniform distribution of pores and grain sizes is indicative of a homogeneously sintered material. A SEM micrograph of a $ZrW_2O_8$·18 wt. % $ZrO_2$ monolith is presented in FIG. 2 in which excess zirconia is observed as nearly spherical inclusions having various diameters. Individual $ZrW_2O_8$ grains cannot be distinguished in the SEM image.

For the $ZrW_2O_8 \cdot xZrO_2$ compositions surveyed, the $ZrO_2$ volume fraction was below the percolation limit such that a 0–3 connectivity (isolated inclusions of $ZrO_2$ in a matrix of $ZrW_2O_8$) was preserved. The percolation limit for a second phase with monodisperse diameters has been calculated to exist at a critical volume fraction of 0.183. Although we have prepared samples with a greater volume fraction of zirconia, all evidence indicates isolated inclusions. Thus significantly higher volume fractions are necessary to reach the percolation limit which is due to the distribution of diameters of the inclusions. Beyond the percolation limit the properties of a monolith with two interpenetrating 3-dimensional matrices (3—3 connectivity) may demonstrate anomalies. In addition, it is possible that the stress placed on a 3—3 ceramic due to the tetragonal to monoclinic phase transformation of the $ZrO_2$ matrix would lead to catastrophic failure of the monoliths.

Powder X-ray diffraction indicates the presence of only the $\alpha ZrW_2O_8$ phase (Powder Diffraction File, Joint Committee on Powder Diffraction Standards, JCPDS, Swarthmore, Pa., card number 13-557) and monoclinic Baddeleyite $ZrO_2$ phase (JCPDS card number 37-1484). However, small amounts of additional phases may be present. The lower detectable limit of other phases by X-ray diffraction is estimated to be 1%.

Figure 3:
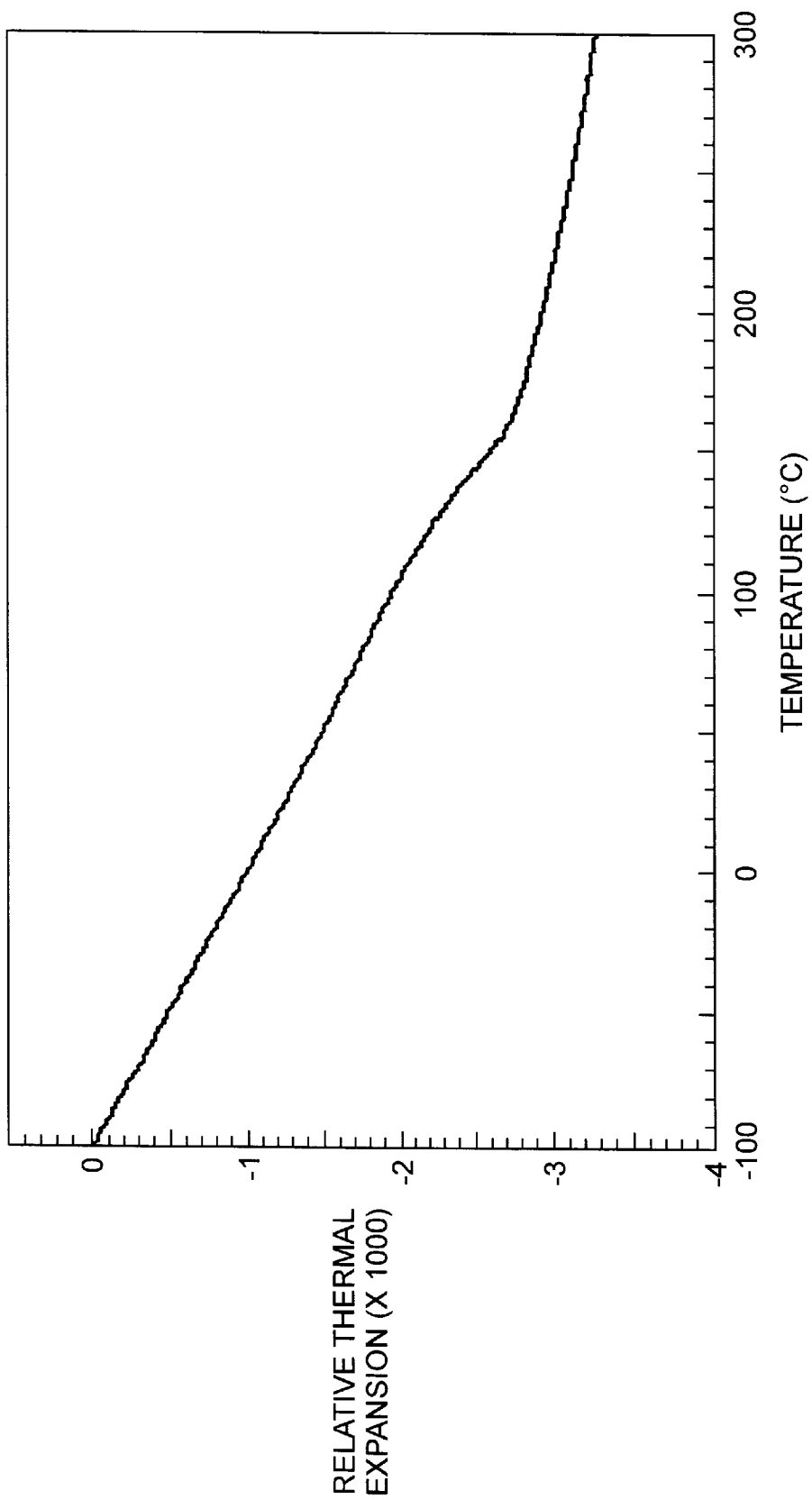
FIG. 3. Relative thermal expansion of a $ZrW_2O_8 \cdot 9.5$ wt. % $ZrO_2$ monolith taken over an extensive temperature range. The coefficient of thermal expansion (CTE) for the range −100 to 100° C. and 200 to 300° C. is $-10 \times 10^{-6}$ and $-3 \times 10^{-6}$ °$C.^{-1}$, respectively. A reversible order-disorder transition takes place near 140° C. which does not compromise the mechanical strength of the monolith.

Thermal Expansivity $ZrW_2O_8$ has demonstrated a negative thermal expansion from 0.3 to 1050 K. The temperature dependence of the thermal expansion of a monolith of $ZrW_2O_8$ with 9.5 wt. % excess $ZrO_2$ is shown in FIG. 3. The order-disorder phase transition at 150° C. is reversible and does not compromise the mechanical strength of the monoliths. In addition, cracking due to the large difference in thermal expansion of $ZrW_2O_8$ and $ZrO_2$ was not observed over the temperature range of −100° to 300° C. The linear negative thermal expansion of the composite facilitates its utilization in applications.

Figure 4:
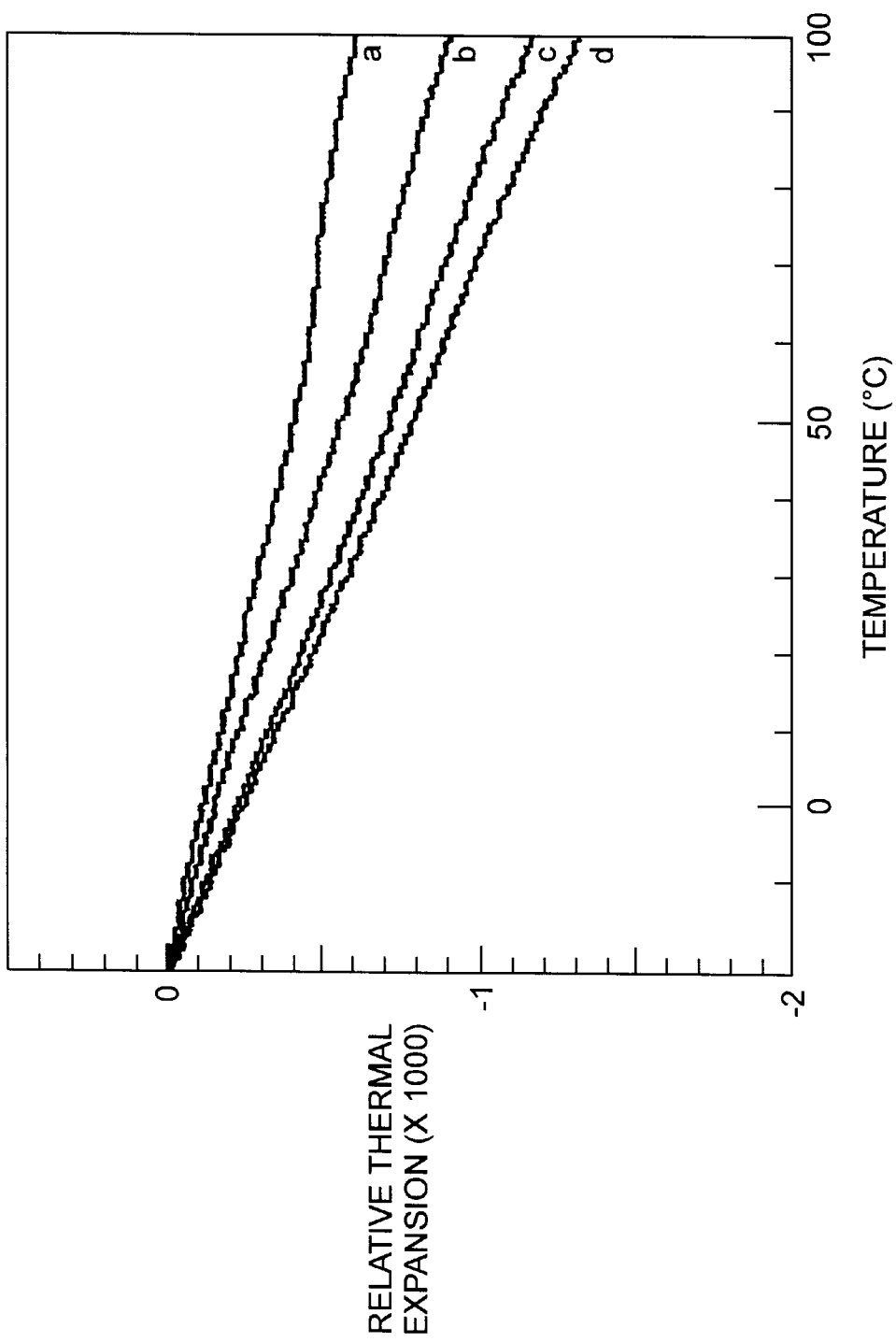
FIG. 4. Relative thermal expansion over ambient working temperatures for several $ZrW_2O_8 \cdot xZrO_2$ monoliths. The following compositions are presented (label, wt. % excess $ZrO_2$, volume fraction $ZrO_2$): a, 37.0%, 0.337; b, 19.5%, 0.174; c, 9.5%, 0.084, d, 0%, 0. Nonlinearity of the thermal expansion is enhanced as the zirconia content increases.
Figure 5:
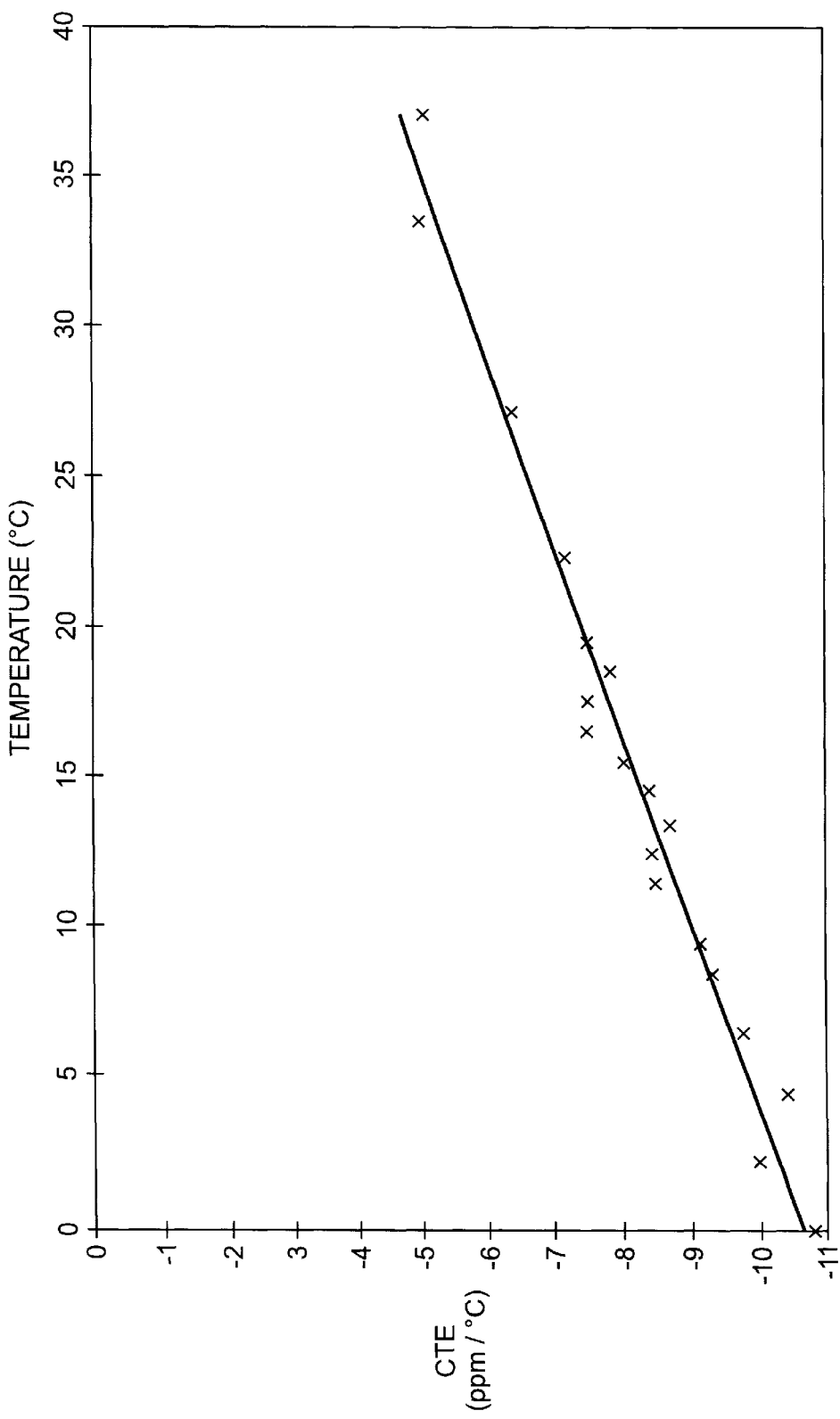
FIG. 5 illustrates the dependence of the Coefficient of Thermal Expansion (CTE) between 0 and 100° C. of two-phase $ZrW_2O_8 \cdot xZrO_2$ ceramics as weight percent of additional $ZrO_2$. The change in CTE demonstrates a linear relationship to the relative amount of $ZrO_2$ inclusions.

The coefficient of thermal expansion of diphasic ceramic monoliths can be tuned by compensating the large negative thermal expansion of $ZrW_2O_8$ with a material having a positive CTE such as $ZrO_2$. Zirconia was chosen as the second phase for its thermodynamic stability in the presence of $ZrW_2O_8$ and for the ease of processing via the reactive sintering technique. Several other refractories react with $ZrW_2O_8$ at the sintering temperature and therefore lead to irreproducible results due to decomposition. In addition to stability, the thermal expansion of $ZrO_2$ is roughly linear from 20 to 100° C. with a CTE of $-8 \times 10^{-6}$ C.$^{-1}$. This is advantageous since the compensation of the thermal expansion leads to an averaged CTE which is also linear over ambient temperatures (FIG. 4). These diphasic ceramics can be tuned from −5 to $-11 \times 10^{-6}$ C.$^{-1}$ for dense monoliths. A linear correlation between the CTE and the volume fraction of $ZrO_2$ occurs over a broad range of compositions (FIG. 5). A simple model, based on an additive relationship of thermal expansions for a monolith without zirconia with a CTE of $-11 \times 10^{-6}$ C.$^{-1}$ and pure $ZrO_2$ with a CTE of $-8 \times 10^{-6}$ C.$^{-1}$, would have a slope of 19. The linear fit to our data has a slope of 17.6 which is in close agreement for the compositions surveyed. This approach, which neglects any anomalies at the percolation limit, suggests that a monolith with a volume fraction of $ZrO_2$ of 0.58 would have a zero CTE.

The thermal expansion was measured along three directions normal to the faces of the ceramic bars. Although $ZrW_2O_8$ crystallizes in a cubic space group, the monoliths are prepared by uniaxially compressing the pre-sintered powder mixture. This processing could introduce anisotropic macroscopic properties. However, the thermal expansion of the bars demonstrates isotropic behavior. Heating rates up to 20° C./min to temperatures of 400° C. with a TMA analyzer did not reveal any decomposition or cracking which would be distinguished as irreproducibility or discontinuities in the CTE, respectively. Degradation of the ceramics was not observed through several heating and cooling cycles.

Compensating the CTE with excess $WO_3$ has been accomplished, but the monoliths have extremely high porosity at the surface to a depth of approximately 120 μm. In order to fabricate mechanically robust monoliths, extensive machining is necessary to remove the porous layer.

Fiber Grating Package

The Bragg wavelength (λ) in a vacuum is given by $$\lambda = 2n_{\mathit{eff}}\Lambda$$

where $n_{\mathit{eff}}$ is the effective refractive index for the guided mode in the fiber, and Λ is the period of the index modulations of the fiber (~0.5 μm for a particular 1550 nm grating). The Bragg wavelength of a fiber Bragg grating is temperature dependent primarily due to the temperature dependence of the refractive index of the silica based glass. In addition, the Bragg wavelength is strain dependent by altering the fringe spacing. As the temperature increases the refractive index of glass increases and vice versa. Also, due to the positive thermal expansion of silica (CTE~−0.5×10$^{-6}$ C.$^{-1}$), the fringe spacing increases slightly with temperature. The wavelength shift that corresponds to refractive index (n) changes due to temperature (T) variations and thermal expansion of silica glass ($\alpha_{thermal}$) can be calculated as follows:

$$\lambda = 2n\Lambda$$

$$\frac{d\lambda}{dT} = 2\Lambda \frac{dn}{dT} + 2n \frac{d\Lambda}{dT}$$

$$\Delta\lambda = 2\Lambda \frac{n}{n} \frac{dn}{dT} \Delta T + 2n \frac{\Lambda}{\Lambda} \frac{d\Lambda}{dT} \Delta T$$

$$\Delta\lambda = \lambda \left( \frac{1}{n} \frac{dn}{dT} + \alpha_{thermal} \right) \Delta T$$

where $CTE = \alpha_{thermal} = \frac{1}{\Lambda} \frac{d\Lambda}{dT}$

For a 100° C. temperature change the shift in wavelength for a particular 1550 nm grating is measured to be about 1.15 nm. The portion of this shift due to the CTE of the silica fiber ($\alpha_{thermal}$) is ~0.08 nm, which is less than 8% of the total shift.

As mentioned before, the grating wavelength is also sensitive to strain. If a grating is stretched, then the grating wavelength will increase. The strain and wavelength relationship can be presented as follows:

$$\frac{\Delta\lambda}{\lambda} = \frac{\Delta l}{l}(1 - P_e)$$

where $\Delta l/l = \epsilon$, the strain, and $P_e$ is the effective photo-elastic constant (~0.22). Due to this effect, it is possible to package a fiber grating on or in a negative expansion material so that package and grating dimensions decrease with an increase in temperature, resulting in a value of $\Lambda$ that falls as the temperature increases. By choosing the appropriate negative expansion coefficient (~ $-9\times10^{-6}$° $C.^{-1}$) that maintains a constant $n_{eff}\Lambda$ product, a grating whose reflecting wavelength shows minimal variation with temperature can be achieved.

Figure 6:
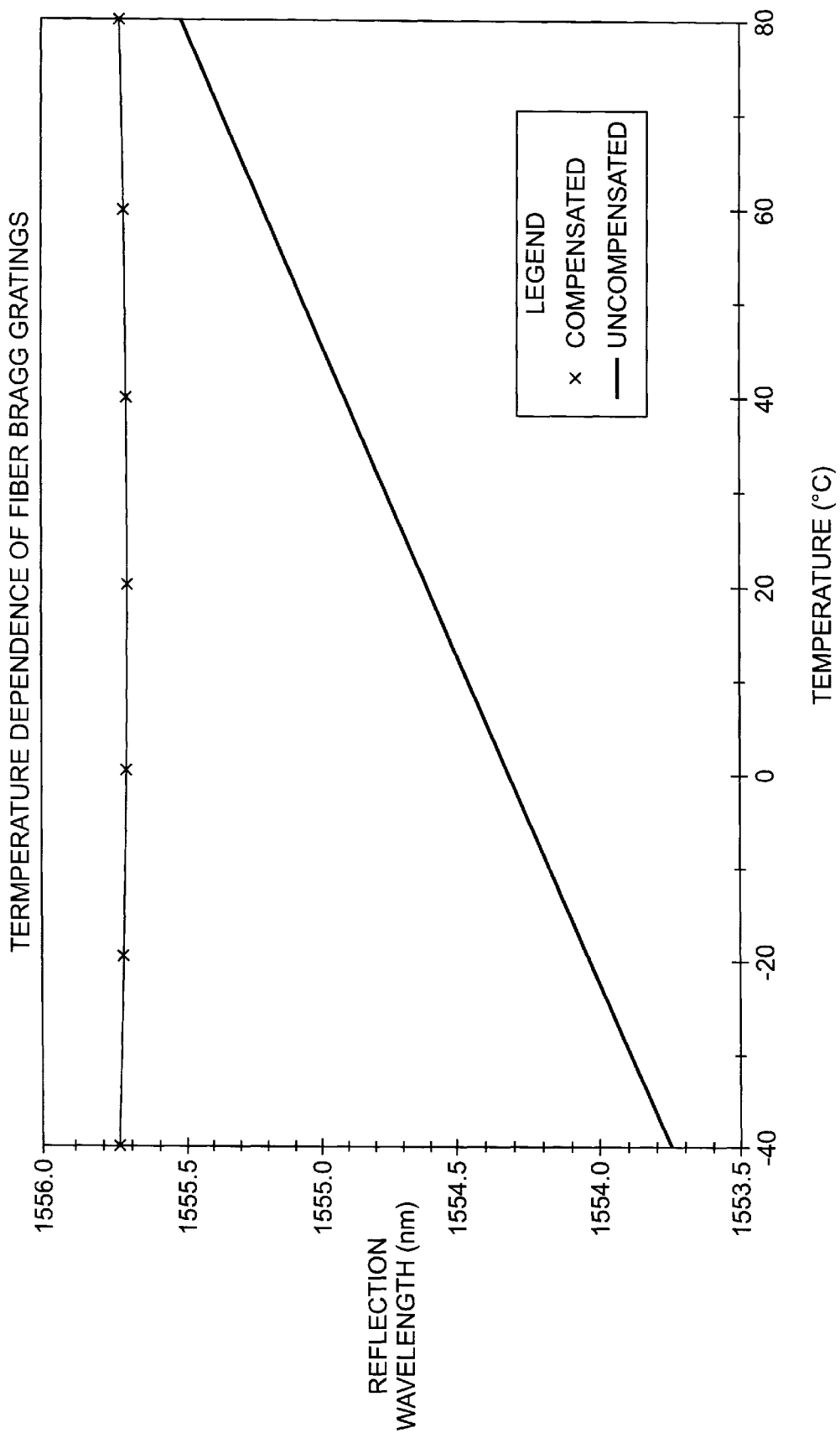
FIG. 6. Reflection wavelength of a fiber Bragg grating as a function of temperature is compensated by a $ZrW_2O_8$ 9.5 wt. % $ZrO_2$ substrate throughout ambient temperature range.

The dependence of the reflection wavelength of both a compensated and an uncompensated fiber Bragg grating as a function of temperature is shown in FIG. 6. The grating that is compensated by a $ZrW_2O_8$.9.5 wt. % $ZrO_2$ monolith demonstrates a 0.05 nm deviation from −40 to 80° C., which is nearly ideal. This substrate can be utilized to fabricate a thermally compensated package suitable for WDM (wavelength division multiplex) applications.

Mechanical Strength

Four-point bending tests were performed on bars of $ZrW_2O_8$. Preliminary tests revealed a low modulus of elasticity ($0.5\times10^6$ psi) for the $ZrW_2O_8.xZrO_2$ monoliths. The modulus of rupture was determined to be 3000 psi. With regards to the grating package, an applied force of 89 N is required to break the monolith which is much greater than the maximum tensile force which is exerted by the fiber (2 N).

The monoliths demonstrate brittle failure having an approximate conchoidal fracture surface. The mechanism proceeds via intergranular fracture around $ZrO_2$ inclusions and intragranular throughout the $ZrW_2O_8$ matrix. Therefore shearing at boundaries between $ZrW_2O_8$ grains does not occur at room temperature.

Conclusion

Reactive sintering of $WO_3$ and $ZrO_2$ powders produces dense monoliths with adequate strengths. The reactive sintering technique circumvents the inherent metastability of $ZrW_2O_8$ in the early stages of densification, thereby yielding reproducible fabrication conditions. Monoliths containing zirconia inclusions demonstrate a range of thermal expansion coefficients linearly related to the volume fraction of $ZrO_2$. A monolith of $ZrW_2O_8.xZrO_2$, which exhibits a negative thermal expansion in the desired range, has been successfully prepared and shown to thermally compensate a fiber Bragg grating.

TABLE 1

Effect of Sintering Aids on the Density of Monoliths

| Additive (0.1 wt. %) | Density (g/cm$^3$) |
|---|---|
| None | 3.25 |
| $SiO_2$ | 3.10 |
| $TiO_2$ | 3.82 |
| ZnO | 3.94 |
| $Al_2O_3$ | 3.95 |
| $Bi_2O_3$ | 4.05 |
| $Y_2O_3$ | 4.21 |

TABLE 2

Effect of Green Body Density on Shrinkage

| Applied Pressure (psi) | Sintered Diameter (mm) | Linear Shrinkage (%)$^a$ | Aspect Ratio$^b$ | Density (g/cm$^3$) |
|---|---|---|---|---|
| 1000 | 5.94 | 6.45 | 1.13 | 4.49 |
| 5000 | 6.02 | 5.20 | 1.17 | 4.42 |
| 10000 | 6.08 | 4.25 | 1.24 | 4.51 |
| 20000 | 6.20 | 2.36 | 1.32 | 4.41 |

$^a$Linear shrinkage determined along diameter.
$^b$Aspect ratio defined as diameter/height of cylindrical monolith after sintering.

EXAMPLES

The following examples are presented to assist those skilled in this technology to understand and practice the invention, without in any way intending to limit the invention to the exemplified embodiments.

Example 1

Preparation of $ZrW_2O_8$ composite ceramics via reactive sintering technique utilizing methyl ethyl ketone (MEK) as the milling solvent.

Milling of $ZrO_2$ and $WO_3$ mixture in methyl ethyl ketone (MEK) for 10–20 hours utilizing stabilized $ZrO_2$ grinding media.

Addition of approximately 2 wt. % of an organic binder (QPAC-40, PAC Polymers Inc.) which is soluble in MEK to above mixture, Evaporation of MEK during continuous stirring of mixture, Sieving of dried mixture through 30–100 mesh screen, Pressing of powder mixtures to form green body, Firing in an oxygen atmosphere on a bed of coarse $ZrW_2O_8$ grains on Pt foil, Slowly heating said green body around 50° C. per hour to around 250° C., Subsequent heating of said green body around 500° C. per hour to around 1150 to 1200° C. with an optimal sintering temperature of 1180° C., Holding said green body at 1180° C. for around 5 hours, Cooling quickly to room temperature by withdrawing the sintered monolith from the furnace.

Example 2

Preparation of $ZrW_2O_8$ composite ceramics via reactive sintering technique utilizing water as the milling solvent.

Milling of $ZrO_2$ and $WO_3$ mixture in water for 10–20 hours utilizing stabilized $ZrO_2$ grinding media, Addition of approximately 5–10 wt. % of an organic binder (polyvinyl alcohol) which is soluble in water to mixture, Evaporation of water during continuous stirring of mixture, Sieving of dried mixture through 30–100 mesh screen, Pressing of powder mixture to form green body, Firing in an oxygen atmosphere on a bed of coarse $ZrW_2O_8$ grains on Pt foil, Slowly heating said green body around 50° C. per hour to around 250° C., Subsequent heating of said green body around 500° C. per hour to around 1150 to 1200° C. with an optimal sintering temperature of 1180° C., Holding said green body at 1180° C. for around 5 hours, Cooling quicly to room temperature by withdrawing the sintered monolith from the furnace.

Example 3

Extrusion of pre-reacted powders.

Milling of $ZrO_2$ and $WO_3$ mixture in methyl ethyl ketone (MEK) for 10–20 hours utilizing stabilized $ZrO_2$ grinding media, Evaporation of MEK, Sieving of dried mixture through 30–100 mesh screen, Addition of approximately 0.3 wt. % plasticizer and lubricant (Union Carbide, PEG-400) to powder mixture.

Addition of approximately 1.0 wt. % dispersant (Angus Chemical Co., AMP-95) to powder mixture, Addition of approximately 4.5 wt. % binder (Rohm and Haas, B-1051) to powder mixture, Addition of approximately 2.4 wt. % binder (Rohm and Haas, B-1052) to powder mixture, Addition of approximately 6.1 wt. % water to powder mixture.

Blended under low shear conditions,

Extruded through die at room temperature.

Example 4

Preparation of $ZrV_2O_7$ composite ceramics via reactive sintering technique utilizing water as the milling solvent.

Milling of $ZrO_2$ and $V_2O_5$ mixture in water for 10–20 hours utilizing stabilized $ZrO_2$ grinding media, Addition of approximately 5–10 wt. % of an organic binder (polyvinyl alcohol) which is soluble in water to mixture, Evaporation of water during continuous stirring of mixture, Sieving of dried mixture through 30–100 mesh screen, Pressing of powder mixture to form green body, Firing in an oxygen atmosphere on a bed of coarse $ZrV_2O_7$ grains on Pt foil, Slowly heating said green body around 50° C. per hour to around 250° C., Holding said green body at 850–900° C. for around 5 hours, Cooling quickly to room temperature by withdrawing the sintered monolith from the furnace.

It is understood that various other modifications will be apparent to and can readily be made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A monolithic, two-phase ceramic body having an isotropic negative coefficient of thermal expansion, a density of at least 90% of the theoretical density, and comprising a first phase selected from the group consisting of $ZrW_2O_8$, $HfW_2O_8$, $ZrV_2O_7$ and $HfV_2O_7$ and a second dispersed phase comprising at least one oxide selected from the group consisting of $WO_3$, $V_2O_5$, $ZrO_2$ and $HfO_2$.

2. A monolithic, two-phase ceramic body having an isotropic negative coefficient of thermal expansion, the ceramic body comprising a first phase selected from the group consisting of $ZrW_2O_8$, $HfW_2O_8$, $ZrV_2O_7$ and $HfV_2O_7$, and a second dispersed phase comprising at least one oxide selected from the group consisting of $WO_3$, $V_2O_5$, $ZrO_2$ and $HfO_2$, produced by a process comprising the steps of:

a) preparing a powder mixture comprising a first and a second oxide precursor powder of the first phase, the first oxide precursor powder selected from the group consisting of $ZrO_2$ powder and $HfO_2$ powder, and the second oxide precursor powder selected from the group consisting of $WO_3$ powder and $V_2O_5$ powder,
wherein the powder mixture contains a non-stoichiometric amount of one of the first and second precursor powders;

b) forming a green body comprising said powder mixture; and c) heat treating the green body at a temperature below the melting temperature of the first phase, and forming the first phase from the heat treated green body by reactive sintering.

3. The two-phase composition according to claim 1, wherein said second phase consists essentially of $WO_3$.

4. The two-phase composition according to claim 1, wherein said second phase consists essentially of $ZrO_2$.

5. The two-phase composition according to claim 1, wherein said second phase consists essentially of $HfO_2$.

6. The two-phase composition according to claim 1, wherein said second phase consists essentially of $V_2O_5$.

7. The two-phase composition according to claim 3, containing up to about 35 volume % $WO_3$, compared to the volume of the first phase.

8. The two-phase composition according to claim 4, containing up to about 35 volume % $ZrO_2$, compared to the volume of the first phase.

9. The two-phase composition according to claim 5, containing up to about 35 volume % $HfO_2$, compared to the volume of the first phase.

10. The two-phase composition according to claim 6, containing up to about 35 volume % $V_2O_5$, compared to the volume of the first phase.

11. The two-phase composition according to claim 1 having a thermal expansion coefficient of about $-9\pm2.5\times10^{-6}$ $C.^{-1}$.

12. The two-phase composition according to claim 1 having a thermal expansion coefficient of about $-9\pm1\times10^{-6}$ $C.^{-1}$.

13. The two-phase composition according to claim 1 having a thermal expansion coefficient of about $-9\pm0.25\times10^{-6}$ °C.$^{-1}$.

14. An article comprising an optical fiber attached to a support, said support comprising a monolithic, two-phase ceramic having an isotropic negative coefficient of thermal expansion, a density of at least 90% of the theoretical density, and comprising a first phase selected from the group consisting of $ZrW_2O_8$, $HfW_2O_8$, $ZrV_2O_7$ and $HfV_2O_7$ and a second dispersed phase comprising at least one oxide selected from the group consisting of $WO_3$, $V_2O_5$, $ZrO_2$ and $HfO_2$.

15. The article of claim 14, wherein said second phase consists essentially of $ZrO_2$.

16. The article of claim 14, wherein the volume percent of $ZrO_2$ in the monolith is up to about 37%.

17. The article of claim 14, wherein said monolith has a thermal expansion coefficient of about $-9\pm2.5\times10^{-6}$ °C.$^{-1}$.

18. A monolithic, two-phase ceramic body having an isotropic negative coefficient of thermal expansion, a density of at least 90% of the theoretical density, wherein said monolithic, two-phase ceramic body comprises a first phase and a second phase, wherein the first phase is selected from the group consisting of $ZrW_2O_8$, $HfW_2O_8$, $ZrV_2O_7$ and $HfV_2O_7$ and wherein the second phase is at least one oxide selected from the group consisting of $WO_3$, $V_2O_5$, $ZrO_2$ and $HfO_2$, and wherein said second phase is dispersed in said first phase.

19. A monolithic, two-phase ceramic body having an isotropic negative coefficient of thermal expansion, wherein the monolithic, two-phase ceramic body comprises a first phase and a second phase wherein said second phase is dispersed in said first phase, wherein the first phase is selected from the group consisting of $ZrW_2O_8$, $HfW_2O_8$, $ZrV_2O_7$ and $HfV_2O_7$, and the second phase is at least one oxide selected from the group consisting of $WO_3$, $V_2O_5$, $ZrO_2$ and $HfO_2$, produced by a process comprising the steps of:

a) mixing a first oxide precursor powder and a second oxide precursor powder of the first phase in a non-stoichiometric amount, wherein the first oxide precursor powder is selected from the group consisting of $ZrO_2$ powder and $HfO_2$ powder, and the second oxide precursor powder selected from the group consisting of $WO_3$ powder and $V_2O_5$ powder, and
wherein said non-stoichiometric amount of one of the first and second precursor powders;

b) forming a green body comprising said powder mixture; and c) heat treating the green body at a temperature below the melting temperature of the first phase, forming the first phase from the heat treated green body by reactive sintering, and thereby producing said two-phase ceramic body comprising said first phase and said second phase.

20. An article comprising an optical fiber attached to a support, said support comprising a monolithic, two-phase ceramic having an isotropic negative coefficient of thermal expansion, a density of at least 90% of the theoretical density, and wherein said monolithic two-phase ceramic body comprises a first phase which is selected from the group consisting of $ZrW_2O_8$, $HfW_2O_8$, $ZrV_2O_7$ and $HfV_2O_7$ and a second phase which is at least one oxide selected from the group consisting of $WO_3$, $V_2O_5$, $ZrO_2$ and $HfO_2$, said second phase being dispersed in said first phase.

21. The two-phase composition according to claim 4, wherein the first phase is $ZrW_2O_8$.

* * * * *